United States Patent Office 3,365,148
Patented Jan. 23, 1968

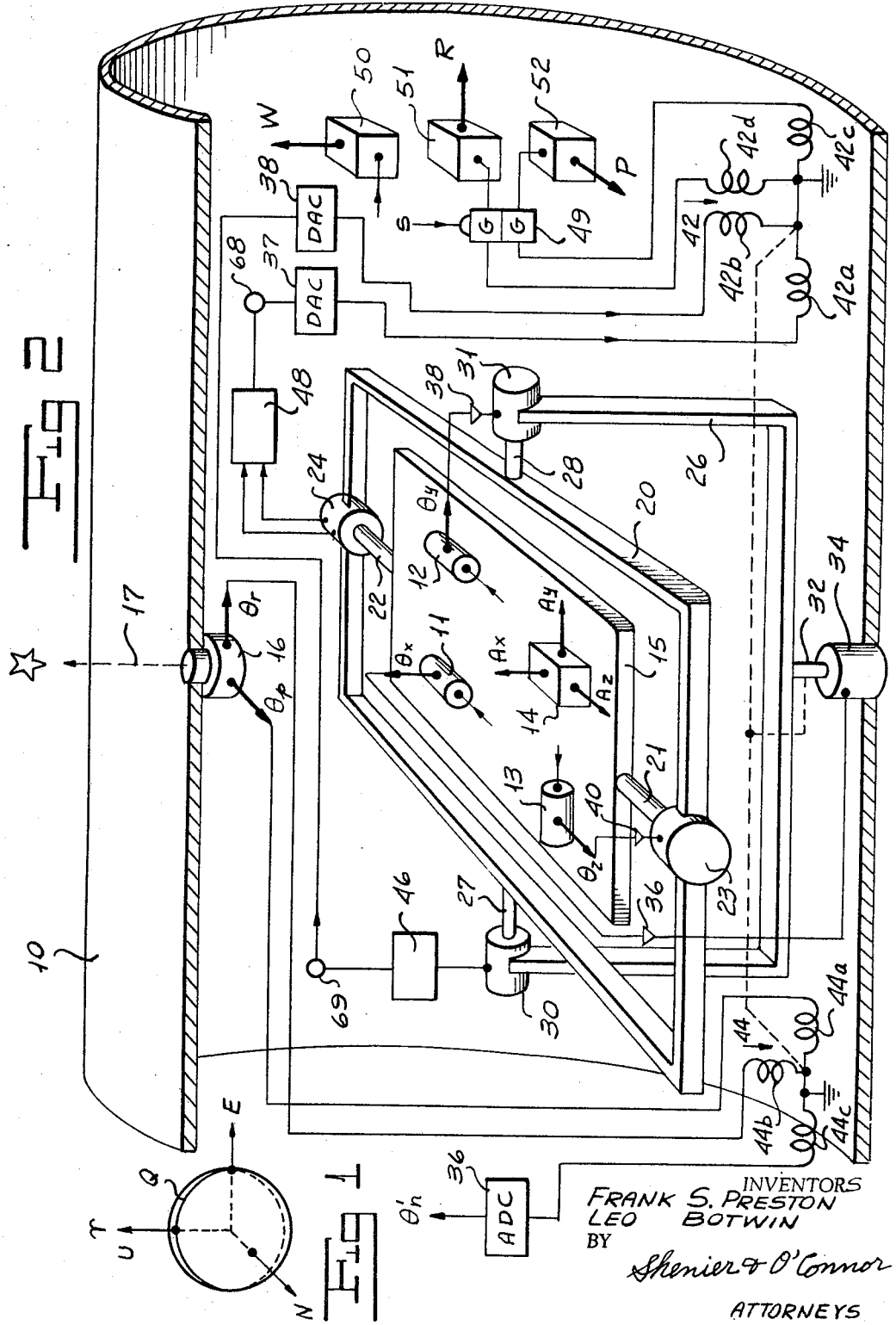

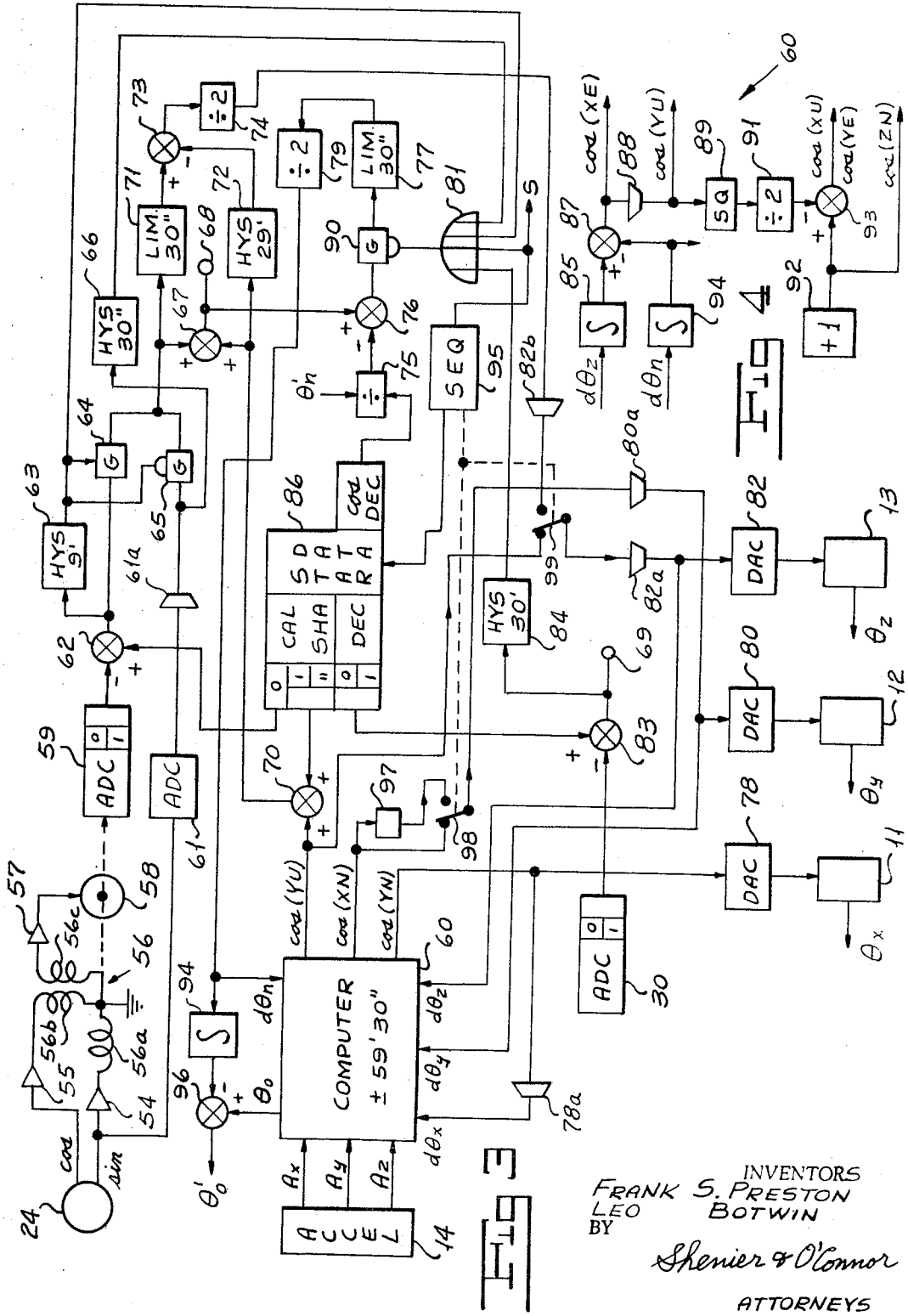

3,365,148
PHASED GUIDANCE SYSTEM
Frank S. Preston, Fairfield, Conn., and Leo Botwin, Port Chester, N.Y., assignors to United Aircraft Corporation, East Hartford, Conn., a corporation of Delaware
Filed Apr. 27, 1964, Ser. No. 362,861
16 Claims. (Cl. 244—3.2)

Our invention relates to guidance systems and more particularly to a phased guidance system adapted to operate in a multiplicity of modes.

All guidance systems are stabilized against rotations of the vehicle carrying the system. In platform systems, this stabilization is achieved mechanically by mounting the inertial elements on a gimballed platform. In strapdown systems where the inertial elements are fixed to the frame of the vehicle, this stabilization is achieved computationally.

Mechanically stabilized platform systems are advantageously employed where the vehicle has high rotation rates and revolves through large angles. Computationally stabilized strapdown systems are advantageous where the vehicle has low rotation rates and revolves through small angles.

In the prior art star sights have been employed for accurate fixing. A basic problem exists, however, in measuring the star angles relative to the reference frame of the inertial system. Some systems of the prior art mount the star sensor on the platform and perform strapdown computations to keep track of the inertial reference while orienting the platform and the star sensor to a star. Other systems mount the star sensor for rotation relative to the platform as, for example, on the body of the vehicle, such as a missile, itself. In such systems permitting relative motion of the platform and star sensor, accurate measurement of gimbal angles is essential.

We have invented a phased guidance system which operates selectively as a mechanically stabilized platform system and as a computationally stabilized strapdown system. In our multiple mode guidance system the star sensor and the platform are mounted for relative movement yet the gimbal angle transducers need provide accurate outputs at only a few angular positions.

One object of our invention is to provide a phased guidance system which selectively operates as a mechanically stabilized platform system.

Another object of our invention is to provide a phased guidance system which selectively operates as a computationally stabilized strapdown system.

A further object of our invention is to provide a multiple mode guidance system in which gimbal angles need be accurately measured at only a few discrete positions.

Other and further objects of our invention will appear from the following description.

In general our invention contemplates the provision of a gimbal-mounted platform upon which are mounted orthogonally disposed gyroscopes and accelerometers. The gyroscope outputs drive gimbal servomotors which stabilize the platform in a reference frame. Conveniently this reference frame is inertial so that star data in the form of sidereal hour angle and declination may be directly employed without coordinate transformation. A star sensor is mounted on the vehicle, such as a missile. The accelerometer outputs are coupled to an inertial reference frame navigation computer. Gimbal angle transducers are provided which are accurately calibrated at certain angular values which should closely, but need not exactly, correspond to the star data angular values.

In order to take a star sight the missile is rotated about the mechanically stabilized platform until the outputs of the gimbal angle transducers achieve their calibrated angular values. At such point the angular error in alignment of the star sensor with a star will correspond to the difference between the calibrated angular values of the gimbal angle transducers and the actual star angles. Upon further rotation of the missile to align the star sensor with a star, the gyroscopes are torqued to maintain the outputs of the gimbal angle transducers at their calibrated values; and the system operates in a strapdown fashion. The angular values corresponding to the torquing of the gyroscopes are coupled to a strapdown computer. Thus strapdown computations are employed to provide vernier outputs about the calibrated gimbal angle transducer values. If a second star sight is to be made our system reverts to the mechanically stabilized platform mode; while the missile is rotated about the platform until the outputs of the gimbal angle transducers reach a new calibrated value which corresponds fairly closely to the coordinate angles of another star. The star data angles, the calibrated gimbal angles, the computed strapdown angles, and the outputs of the star sensor are combined to provide an error signal which is coupled to the strapdown computer so as to change the orientation of the inertial reference frame until the error signal is nulled.

In the accompanying drawings which form part of the instant specification and which are to be read in conjunction therewith and in which like reference numerals are used to indicate like parts in the various views:

FIGURE 1 is an orthographic view showing the orientation of the inertial reference frame.

FIGURE 2 is a perspective view with parts broken away showing the mechanical configuration of the platform components and their cooperation with the missile attitude controllers.

FIGURE 3 is a schematic view showing the remaining components of the system.

FIGURE 4 is a schematic view showing in detail the computation of direction cosines.

More particularly referring now to FIGURE 1, we employ advantageously an inertial reference frame having orthogonally disposed axes, N, E, and U. The N axis is parallel to the earth's polar axis. The E and U axes are orthogonally disposed in the earth's equatorial plane Q. Preferably the U axis coincides with Aries.

Referring now to FIGURE 2, mounted on a platform 15 are three single-degree-of-freedom gyroscopes 11, 12, and 13 and an accelerometer unit 14. Gyroscopes 11, 12, and 13 measure the respective rotations $\theta_x$, $\theta_y$, and $\theta_z$ about orthogonally disposed platform axes X, Y, and Z. Accelerometer unit 14 measures the accelerations $A_x$, $A_y$, and $A_z$ along the respective platform axes. A star sensor 16 is mounted in the wall of a generally cylindrical missile 10. Star sensor 16 provides outputs $\theta_p$ and $\theta_r$ in accordance with angular deviations of the line of sight 17 about the respective missile pitch and roll axes P and R. When the line of sight 17 coincides with the missile yaw axis W the $\theta_p$ and $\theta_r$ outputs are zero. Star sensor 16 may have a field of view of 1° or ±30′. Platform 15 is supported by a pair of stub shafts 21 and 22 secured to the respective rotors of a Z axis servomotor 23 and gimbal angle transducer 24, the stators of which are mounted in a gimbal 20. Transducer 24 is preferably a resolver having a multiplicity of pairs of poles. Conveniently there may be 720 poles thus providing 360 pairs of poles so that the output of resolver 24 completes one cycle of 360 electrical degrees for each one degree of mechanical rotation. Gimbal 20 is supported by a pair of stub shafts 27 and 28 secured to the respective rotors of Y axis servomotor 31 and gimbal angle transducer 30, the stators of which are secured to a half gimbal 26. Transducer 30 is conveniently a shaft position analog-to-digital converter providing an output in degrees and minutes. Gimbal 26 is supported by a stub shaft 32 secured to the rotor of an X axis servomotor 34, the stator of which is secured to the interior wall 10 of the missile. Stub shaft 32 is aligned with the yaw axis W. The sine and cosine outputs of multiple pole pair resolver 24 are coupled to a circuit 48 which provides an output at terminal 68. The output of shaft position analog-to-digital converter 30 is coupled to a circuit 46 which provides an output at terminal 69. The details of circuits 46 and 48 are shown in FIGURE 3. The rotors of a pair of resolvers indicated generally by the reference numerals 42 and 44 are coupled to shaft 32. Resolver 42 is provided with rotor windings 42a and 42b and with stator windings 42c and 42d. Resolver 44 is provided with rotor windings 44a and 44b and with a stator winding 44c. Terminal 68 is coupled to a digital-to-analog converter 37, the output of which is applied to winding 42a. Terminal 69 is coupled to a digital-to-analog converter 38, the output of which is applied to winding 42b. Winding 42c is coupled through one of a pair of simultaneously actuated gates 49 to a missile pitch attitude controller 52; and winding 42d is coupled through the other of gates 49 to a missile roll attitude controller 51. Attitude controllers 51 and 52 may actuate auxiliary maneuvering jets employing hydrogen peroxide, as is well known to the art. A signal S is coupled to an inhibiting input of simultaneous gates 49. The $\theta_p$ and $\theta_r$ outputs of star sensor 16 are coupled respectively to windings 44a and 44b. Winding 44c is coupled to a voltage analog-to-digital converter 36 which provides an output $\theta_n'$.

Referring now to FIGURE 3 the sine and cosine outputs of multiple pole pair resolver 24 are coupled through respective buffer amplifiers 54 and 55 to the stator windings 56a and 56b of a resolver indicated generally by the reference numeral 56 having a rotor winding 56c. Winding 56c actuates a servomotor 58 through an amplifier 57. Servomotor 58 simultaneously drives the rotor of resolver 56 and a shaft position analog-to-digital converter 59 which provides an output in degrees and minutes. The outputs of accelerometer unit 14 are coupled to an inertial reference frame random orientation navigation computer 60 which provides nine direction cosine outputs relating the X, Y, and Z axes with the E, N, and U axes. Computer 60 may be of the type shown in the copending application Ser. No. 164,649, filed Jan. 15, 1962, now Patent No. 3,272,972 for Random Orientation Inertial System. A star data source 86 provides the calibrated sidereal hour angle in degrees and minutes and seconds, and the declination in degrees and minutes, and the cosine of declination for a plurality of stars. The sine output of multiple pole pair resolver 24 is coupled to a voltage analog-to-digital converter 61. This sine output provides zero electrical degree nulls at approximately 1° rotational increments of transducer 24. However, errors of several seconds or minutes may exist in such nulls of the sine output. The calibrated sidereal hour angle output of the source 86 is equal to the actual sidereal hour single of a star corrected for the null error in transducer 24 at the nearer integral number of degrees. For example, if the star is Vega having a sidereal hour angle of 81°5′13″ and the sine output of transducer 24 is nulled at 81°1′3″ so that the null error at the nominal 81° increment is plus 1′3″, then the calibrated sidereal hour angle output of source 86 should be 81°5′13″ minus 1′3″ which equals 81°4′10″. If the star is Achernar having a sidereal hour angle of 335°54′20″ and the sine output of transducer 24 has no null error at 336°, then source 86 should provide a sidereal hour angle output having a value in degrees of 336 and an output in minutes and seconds of minus 5′40″. Thus if the calibrated sidereal hour angle of the star has a fractional degree portion which is less than 30′ then we provide an output in degrees corresponding to that of the star; however if the fractional degree portion of the calibrated sidereal hour angle is greater than 30′ then we provide a sidereal hour angle output in degrees which is one greater than that of the star and provide a fractional degree output which is to be subtracted. Thus the fractional degree output of the calibrated sidereal hour angle from source 86 will always be less than 30′. This minutes and seconds output of the calibrated sidereal hour angle, which should be expressed in radians or even more accurately as the sine function, is coupled to one input of an adding circuit 70. Computer 60 provides a cos(YU) output which is also coupled to circuit 70 and to one contact of a double-throw switch 99. This output is the direction cosine of the angle between the Y and U axes. The integral degrees output of the calibrated sidereal hour angle is coupled to one input of a subtraction circuit 62 the other input of which is obtained from the output of converter 59. The output of converter 61 is applied to a sign inverting circuit 61a. The outputs of circuit 62 and of inverter 61a are coupled through respective gates 64 and 65 to one input of adding circuit 67 and to a limiter 71 the output of which is prevented from exceeding 30″. The output of circuit 70 is coupled to the other input of circuit 67 and to the input of a subtractive hysteresis circuit 72 which provides an output corresponding to the excess of an input over 29′. The output of circuit 62 is coupled to the input of a logic hysteresis circuit 63 which provides an output if its input exceeds 9′. The output of inverter 61a is connected to the input of a logic hysteresis circuit 66 which provides an output if its input exceeds 30″. The output of hysteresis circuit 63 is coupled to an enabling input of gate 64 and to an inhibiting input of gate 65. The outputs of limiter 71 and of hysteresis circuit 72 are combined in a subtraction circuit 73. The output of subtraction circuit 73 is coupled to a circuit 74 which divides such output by a factor of 2. In the binary code, division by a factor of 2 is accomplished by merely shifting the places of significance through one bit. The output of bit-shifting circuit 74 is coupled through a sign inverting circuit 82b to the other contact of switch 99. The armature of switch 99 is coupled through a sign inverting circuit 82a to a $d\theta_z$ input of computer 60 and to a high accuracy digital-to-analog converter 82, the output of which is coupled to the torquing input of gyroscope 13. The cos DEC output of source 86 is coupled to the denominator input of a dividing circuit 75, to the numerator input of which is applied the $\theta_n'$ output of converter 36 (FIGURE 2). The output of dividing circuit 75 is combined with the the output of circuit 67 in a subtraction circuit 76. The output of circuit 67 is also coupled to terminal 68 which corresponds to that shown in FIGURE 2. The output of circuit 76 is coupled through a gate 90 to a limiter 77 the output of which cannot exceed 30″. The output of limiter 77 is coupled to a circuit 79 which shifts the places of significance through one binary bit thus dividing by a factor of 2. The output of dividing circuit 79 is coupled to the $d\theta_n$ input of computer 60 and to an integrator 94. Computer 60 provides an output $\theta_o$ which represents the assumed initial value of longitude. This $\theta_o$ output is combined with the output of integrator 94 in a subtraction circuit 96 to provide the true longitude output $\theta_o'$. The output of converter 30 is combined with the DEC output of source 86 in a subtraction circuit 83. The output of circuit 83 is coupled to terminal 69, which corresponds to that shown in FIGURE 2, and to the input of a logic hysteresis circuit 84 which provides an output if its input exceeds 30′. The outputs of hysteresis circuits 63, 66, and 84 are coupled to an OR circuit 81 the output of which is applied to an inhibiting input of gate 90. Computer 60 also provides the outputs cos(XN) and cos(YN). The cos(YN) output is applied through a sign inverting circuit 78a to a $d\theta_x$ input of computer 60. The cos(YN) output is also coupled to the input of an accurate digital-to-analog converter 78 the output of which is applied to the torquing input of gyroscope 11. The cos(XN) output is coupled to one contact of a double-throw switch 98 and to a circuit 97 the output of which is applied to the other contact of switch 98. The armature of switch 98 is coupled through a sign inverting circuit 80a to a $d\theta_y$ input of computer 60 and to an accurate digital-to-analog converter 80 the output of which is applied to the torquing input of gyroscope 12. A programming sequencer 95 provides a first output which simultaneously actuates switches 98 and 99, a second output which indexes the star data source 86, and a third output S which is coupled to OR circuit 81 and to gates 49 (FIGURE 2).

In operation of our invention with the missile on the ground not moving over the surface of the earth so that the velocity of the missile is known to be zero and maneuvering accelerations known to be absent, the inertial reference is inherently established by introducing dampening into the system in any manner well known to those skilled in the art. The system is preferably quickened from its normal Schuler tuning to reduce the time period for establishing the inertial reference. This inertial reference is substantially perfect for both latitude and North since these are defined by the earth's polar axis about which angular rotation takes place. Accordingly the N axis will be in substantially perfect alignment with the earth's polar axis. No inertial system can detect or correct errors in longitude. We will assume that the initial launch position of the missile is known to within 30 nautical miles, that is the $\theta_0$ output is correct within 30 minutes of longitude. Before launch, programming sequencer 95 causes switches 98 and 99 to be in the positions shown. For all rotational elements, clockwise rotation corresponds to positive polarity. If the Y axis is not disposed at 90° relative to the N axis, as at 89°, then cos(YN) will have a positive value. This causes a negative $d\theta_x$ input to computer 60 and positive currents from converter 78 which torque gyroscope 11. The $\theta_x$ output of gyroscope 11 through amplifier 36 drives servomotor 34, rotating platform 15 clockwise about the X axis until the Y axis lies in the equatorial plane Q and cos(YN) is zero. Similarly, if the X axis is not disposed at 90° relative to the N axis, as at 89°, then cos(XN) will have a positive value. This produces a negative $d\theta_y$ input to computer 60 and causes converter 80 to produce negative torquing currents to gyroscope 12. The $\theta_y$ output of gyroscope 12 through amplifier 38 drives servomotor 31, rotating platform 15 counterclockwise about the Y axis until the X axis is in the equatorial plane Q and cos(XN) is zero. If the Y axis is not disposed at 90° relative to the U axis, as at 89°, then cos(YU) will have a positive value, providing a negative $d\theta_z$ input to computer 60 and causes converter 82 to produce negative torquing currents to gyroscope 13, the $\theta_z$ output of which, through amplifier 40, drives servomotor 23, rotating platform 15 counterclockwise about the Z axis until the Y axis is aligned with the E axis and cos(YU) is zero. Thus the platform axes are aligned with the inertial reference frame axes.

Immediately prior to launch the damping and quickening of computer 60 which established the N axis of the inertial frame are removed and the system is restored to undamped Schuler tuning. Upon launch and during the boost phase while the missile is subjected to large accelerations and rapid maneuvering our system operates in a mechanically stabilized platform mode. After thrust cut-off, where the vehicle acceleration is reduced substantially to zero, requirements for rapid maneuvering are no longer present, and the missile is above all cloud layers, sequencing programmer 95 actuates switches 98 and 99, causes star date source 86 to provide the various coordinates of a preselected star, and disables the S input to OR circuit 81 and simultaneously gates 49. Errors due to flexure are minimal, since the vehicle is in a zero-gravity, free-fall state. It is the purpose of the star sight to correct mainly for errors in the assumed initial or dead reckoning longitude since latitude and North have already been established on the ground. Accordingly it is desirable that the star have a declination which does not appreciably exceed 60°. Of the fifty-eight commonly used navigation stars, only Polaris need be excluded but Atria, Kochab and Miaplacidus would not ordinarily be used. Accordingly transducer 24 need not be calibrated at more than 54 to 57 integral degree points. Furthermore Schedar (350°24′ SHA) and Diphda (349°34′ SHA) would both be calibrated at 350° SHA; Rigel (281°48′) and Capella (281°30′) at 282°; Bellatrix (279°12′) and Elnath (279°0′) at 279°; and Shaula (97°13′) and Rasalhague (96°41′) would both be calibrated at 97° SHA. This reduces the number of calibration points by four to between 50 and 53. The disabling of the S output of sequencer 95 causes gates 49 to respond to the stator outputs of resolver 42.

Assume that the selected star is Vega having an approximate declination of N 38°45′ and as previously indicated a precise sidereal hour angle of 81°5′13″. Further assume that the sine output of multiple-pole-pair resolver 24 is precisely nulled at 81° so that the calibrated sidereal hour angle is equal to the actual SHA of Vega. We may assume initially that the gimbal angle output of converter 59 is 0°. The output of subtracting circuit 62 is then initially 81°. This exceeds the 9′ range of hysteresis circuit 63 which accordingly provides an output, inhibiting gate 65 and enabling gate 64. The output of subtracting circuit 62 is thus coupled through gate 64 to limiter 71 which provides its maximum output of 30″. Initially cos (YU) is zero and, the minutes and seconds output of the calibrated SHA being +5′13″, the output of circuit 70 is +5′13″. Circuit 67 then provides an initial output of 81°5′13″ at terminal 68. The positive output at terminal 68 is coupled through converter 37 to winding 42a. In the position of resolver 42 shown in FIGURE 1, winding 42c provides a negative output which is coupled through the now enabled gate 49 to the pitch attitude controller 52, causing the missile to begin to rotate counterclockwise about the P axis in a direction to reduce the output of circuit 67 toward zero. Since the input to hysteresis circuit 72 is less than 29′ no output is coupled to circuit 73. Accordingly circuit 73 provides a positive output of 30″ causing circuit 74 to provide an output of 15″ which is coupled through inverter 82b, switch 99, and inverter 82a, producing a positive $d\theta_z$ input to computer 60 and, through converter 82, to gyroscope 13. The $\theta_z$ output of gyroscope 13 rotates platform 15 clockwise about the Z axis, increasing the output of converter 59 from zero and reducing the output of circuit 62. The output of circuit 67, however, remains unchanged, since the positive $d\theta_z$ input to computer 60 increases the cos (YU) output from zero. Torquing of gyroscope 13 results in equal changes in both the output of converter 59 and the cos (YU) output of computer 60. This torquing continues until the cos (YU) output (which is of course expressed in radians) is equivalent to +24′17″ so that the output of circuit 70 is 29′30″ and the output of hysteresis circuit 72 is 30″. The output of circuit 73 is thus reduced to zero; and no further torquing of gyroscope 13 occurs, since otherwise the output of hysteresis circuit 72 would exceed the output of limiter 71, causing the platform to be torqued counterclockwise about the Z axis until the output of hysteresis circuit 72 is again 30″. Meanwhile counterclockwise rotation of the missile about the P axis causes the output of converter 59 gradually to increase to 80°51′, whereupon the output of circuit 62 decreases to 9′; and hysteresis circuit 63 provides no output. This enables gate 65 and disables gate 64. With 360 pairs of poles for resolver 24, 9 mechanical minutes corresponds to 54 electrical degrees of the sine output from a null. The nonlinearity error in approximating the sine of an angle by the angle itself at a value of 54 electrical degrees is $$\frac{(.9)^3}{3!} = .12 \text{ or } 12\%$$

since 54 electrical degrees is approximately equivalent to .9 radian. Also at this point a change of 1′ in the output of converter 559 causes a change in the 9′ output of circuit 62 of .11 or 11%. Thus gate 64 is disabled and gate 65 is enabled where the percentage error due to discrete digital changes in the output of circuit 62 is approximately equal to the nonlinearity error in the approximation that the sine of an angle is equal to the angle itself for the sine output of resolver 24. The negative output of converter 61 causes a positive output from inverter 61a, so that no change occurs in the +9' input to limiter 71 and circuit 67. Rotation of the missile continues until the output of inverter 61a decreases to 30" mechanical rotation which corresponds to 3 electrical degrees of resolver 24, whereupon hysteresis circuit 66 provides no output. Meanwhile the DEC output of source 86 (Vega, +38°45') is compared with the output of gimbal angle transducer 30 in circuit 83. If the initial output of converter 30 is zero, the positive error at terminal 69 is coupled through converter 38 to resolver 42, which, in the position shown, couples a positive signal through gate 49 to the missile roll attitude control 51 causing clockwise rotation about the R axis in a direction to reduce the error signal at terminal 69 toward zero. As long as the output at terminal 69 exceeds 30', hysteresis circuit 84 provides an output to OR circuit 81. When the output of circuit 83 decreases to 30', the output of hysteresis circuit 84 drops to zero. With no output from hysteresis circuits 63, 66, and 84, and with no S output from sequencing programmer 95, OR circuit 81 provides no output, thereby enabling gate 90. With a 29'30" output from circuit 70 and a gimbal angle error provided by the sine output of transducer 24 corresponding to 30", the axis 17 of the star sensor 16 will be directed to a sidereal hour angle which is 30' less than that of Vega (assuming the initial dead reckoning longitude is correct). With a field of view for star sensor 16 of ±30' or 1°, Vega should appear at the edge of the field of view, if the declination error signal at terminal 69 is nearly nulled. The output of circuit 67 which is now 30' is coupled to circuit 76. If the original dead reckoning longitude were correct, then the output $\theta_p$ (assuming no missile rotation about the yaw axis W occurred) would be 23.4' negative. In the position of resolver 44 shown in FIGURE 2, the output from winding 44c is 23.4° positive irrespective of the magnitude of the star angle declination error $\theta_r$. Hence $\theta_n'$ is +23.4°. The cos DEC output of source 86 is .78 since Vega has a declination of 38°45'. The output of circuit 75 is thus $$\frac{23.4'}{.78} = 30'$$

and the output of circuit 76 is zero.

Assume however that the output $\theta_n'$ upon enabling gate 90 is −19.5'. The output of circuit 75 is −25'. This means that the star is closer to the center of the field of view than it should be if the assumed initial longitude were correct and hence that the U axis is disposed not at 0° sidereal hour angle but instead at 5'. The +5' output from circuit 76 is coupled through gate 90 to limiter 77 which provides its maximum output of +30". This is divided by a factor of 2 in circuit 79, coupling an initial signal of +15" to the $d\theta_n$ input of computer 60 and to integrator 94.

This positive $d\theta_n$ input causes the reference frame to rotate clockwise about the N axis relative to inertial space, moving the U axis from +5' SHA towards 0° SHA. Accordingly cos (YU) becomes more negative and gradually decreases from an initial value in radians corresponding to 24'17". For the initial 2" $d\theta_n$ input, cos (YU) decreases by 2" to 24'15"; and the output of circuit 70 likewise decreases by 2" to 29'28". The output of hysteresis circuit 72 thus decreases to 28" and the output of circuit 73 will be +2". This signal is coupled through divider 74 and inverters 82b and 82a to converter 82, which torques gyro 13, and to the $d\theta_z$ input of computer 60. The platform is torqued clockwise about the Z axis through 1", increasing cos (YU) to a value in radians corresponding to 24'16". The output of circuit 70 increases from 29'28" to 29'29"; and the output of hysteresis circuit 72 increases from 28" to 29". The 1" clockwise rotation of the platform about the Z axis decreases the output of inverter 61a by 1" from 30" to 29" so that the output of circuit 73 is again nulled. The 1" decrease in each of the two inputs of circuit 67 results in a decrease by 2" in its output. Accordingly the output of circuit 76 likewise decreases by 2" which corresponds to the 2" $d\theta_n$ input. From the foregoing it will be appreciated that when the output of integrator 94 is +1' representing the integration of the $d\theta_n$ inputs by virtue of stellar error signal from circuit 76, the inertial reference frame is rotated 1' clockwise about the N axis, the platform is rotated 30" clockwise about the Z axis, cos (YU) is decreased by 30" from 24'17" to 23'47", the output of circuit 70 is also decreased by 30" from 29'30" to 29', the output of inverter 61a is decreased by 29'30" to zero, the output of circuit 67 is decreased by 1' from 30' to 29', and the output of circuit 76 is likewise decreased by 1' from 5' to 4'. With an output of circuit 70 of 29' or less, hysteresis circuit 72 provides no subtractive output; and the output of inverter 61a operates substantially at a null. The system then operates substantially in a pure strapdown mode since maintaining the output of inverter 61a at a null implies that platform motion is made to correspond to missile motion. For the residual 4' of $d\theta_n$ input to computer 60 and integrator 94, cos (YU) decreases by 4' from 23'47" to 19'47"; the outputs of circuits 70 and 67 both decrease from 29' to 25'; and the output of circuit 76 decreases from 4' to zero. The output of integrator 94 thus increases from 1' to 5'. This decreases the longitude output $\theta_o'$ by 5', correcting the error in the initial assumed value of longitude. The foregoing assumes that no rotation of the missile takes place during the stellar correction to the longitude output $\theta_o'$. It will be appreciated that rotation of the missile in actuality continues during the stellar correction period since the output of circuit 67 at terminal 68 decreases only by 5' from 30' to 25'.

Suppose, however, that the original dead reckoning longitude were correct so that upon enabling gate 90 the positive output of circuit 67 is equal to the negative output of circuit 75, and the output of circuit 76 is zero. The missile continues to rotate counterclockwise about the P axis in a direction to reduce the error signal at terminal 68 toward zero. Upon the actuation of gate 90 this error signal is 30'. For the initial 2" rotation of the missile, the output of inverter 61a decreases from 30" to 28". Since the output of hysteresis circuit 72 is +30" the output of circuit 73 will be −2". This signal is coupled through divider 74 and inverters 82b and 82a to converter 82, which torques gyro 13, and to the $d\theta_z$ input of computer 60. The platform is torqued counterclockwise about the Z axis through 1", and cos (YU) decreases by 1" from 24'17" to 24'16". The output of circuit 70 thus decreases from 29'30" to 29'29". Such rotation of the platform about the Z axis increases the output of inverter 61a by 1" from 28" to 29". The output of hysteresis circuit 72 is now 29" and the output of circuit 73 is nulled. Thus it will be seen that for the initial 1' rotation of the missile from the time gate 90 is enabled, the output at terminal 68 decreases by 1' from 30' to 29', the output of inverter 61a decreases from +30" to 0, cos (YU) decreases by 30" from 24'17" to 23'47", the output of circuit 70 decreases from 29'30" to 29', and the output of hysteresis circuit 72 correspondingly changes from +30" to 0. So long as the angular error of the line of sight 17 is less than 29', hysteresis circuit 72 provides no output; and inverter 61a operates substantially at a null. The system now operates in substantially a pure strapdown mode, since gyro 13 is torqued so that the platform is forced to follow missile rotation. Some relative movement between the missile and the platform will exist, since a small output is necessary from gimbal angle converter 61 to produce a signal level sufficient to torque the platform at the same rate as the missile rotates relative to inertial space. This small relative motion produces no error since inverter 61a is coupled to circuit 67. Moreover good linearity and high accuracy are readily maintained within the limited range of ±30" mechanical rotation, corresponding to 3° electrical rotation of transducer 24. During the remaining 29' of missile rotation, cos (YU) decreases from 23'47" to −5'13"; and the outputs of circuits 70 and 68 decrease from 29' to 0. A cos (YU) output in radians which corresponds to an angle of −5'13" represents a counterclockwise rotation of the platform about the N axis from the reference frame. Thus the line of sight 17 is disposed at a sidereal hour angle of 81°5'13". Of this the 81° is measured by the gimbal angle transducer 24. The 5'13" is measured by a corresponding rotation of the platform relative to the inertial reference frame.

Since the fractional degree output of the calibrated sidereal hour angle will not exceed 30' and since the output of circuit 70 will not exceed 9'30", the cos (YU) output of computer 60 cannot exceed a value in radians corresponding to an angle of 59'30". Since the platform is rotated relative to the reference frame by less than 1°, certain computational simplifications result. The following equations describe the incremental changes in the direction cosines which occur either because of rotations of the platform relative to the reference frame which occur by virtue of the torquing signals coupled to gyros 11 through 13 or because of rotations of the reference frame itself relative to inertial space by virtue of the stellar error signal obtained during the taking of star sights.

(1) $d \cos (XE) = d\theta_z \cos (YE) - d\theta_y \cos (ZE) + d\theta_u \cos (XN) - d\theta_n \cos (XU)$ (2) $d \cos (ZE) = d\theta_y \cos (XE) - d\theta_x \cos (YE) + d\theta_u \cos (ZN) - d\theta_n \cos (ZU)$ (3) $d \cos (XN) = d\theta_z \cos (YN) - d\theta_y \cos (ZN) + d\theta_e \cos (XU) - d\theta_u \cos (XE)$ (4) $d \cos (YN) = d\theta_x \cos (ZN) - d\theta_z \cos (XN) + d\theta_e \cos (YU) - d\theta_u \cos (YE)$ (5) $d \cos (YU) = d\theta_x \cos (ZU) - d\theta_z \cos (XU) + d\theta_n \cos (YE) - d\theta_e \cos (YN)$ (6) $d \cos (ZU) = d\theta_y \cos (XU) - d\theta_x \cos (YU) + d\theta_n \cos (ZE) - d\theta_e \cos (ZN)$ (7) $d \cos (XU) = d\theta_z \cos (YU) - d\theta_y \cos (ZU) + d\theta_n \cos (XE) - d\theta_e \cos (XN)$ (8) $d \cos (YE) = d\theta_x \cos (ZE) - d\theta_z \cos (XE) + d\theta_u \cos (YN) - d\theta_n \cos (YU)$ (9) $d \cos (ZN) = d\theta_y \cos (XN) - d\theta_x \cos (YN) + d\theta_e \cos (ZU) - d\theta_u \cos (ZE)$ The foregoing equations contemplate unlimited rotations of the platform relative to the reference frame and of the reference frame relative to inertial space.

Thus far we have described an embodiment in which only a single star sight is necessary to correct for errors in longitudinal and thus produce a $d\theta_n$ input to computer 60. However we contemplate a system in which latitude and North corrections are made since the initial ground alignment of the N axis with the earth's polar axis may be in error by perhaps a few seconds. In such event, a plurality of star sights may be made and it is necessary accurately to measure gimbal rotation about the Y axis. The entire measuring system associated with the Y axis would be duplicated for the Y axis. A multiple-pole-pair resolver is then employed for the Y axis gimbal angle transducer. Star data source 86 should provide the declination of Vega in integral degrees (39°) and in a fractional degree portion expressed in radians which is less than ±30' (−15'0"). In making stellar corrections of latitude and North, Polaris and other high latitude stars may be employed. The Y axis transducer may have 720 poles to provide nulls at 1° intervals. This transducer need not be calibrated however at more than 58 integral degree points. Furthermore Denebola (N14°46') and Markab (N15°1') would both be calibrated at N15°; Alpheratz (N28°53') and Elnath (N28°35') at N29°; Alkaid (N49°30') and Mirfak (N49°44') at N50°; Alioth (N56°9') and Schedar (N56°20') at N56°; also Alphard (S8°30') and Rigel (S8°15') at S8°; Sabik (S15°41') and Zubenelgenubi (S15°54') at S16°; Sirius (S16°40') and Gienah (S17°21') at S17°; Antares and Nunki (both S26°21') at S26°; Ankaa (S42°30') and Suhail (S43°17') at S43°; and Achernar (S57°25') and Gacrux (S56°55') and Peacock (S56°51') may all be calibrated at S57°. This reduces the number of calibration points by eleven to 47. Circuit 83 and hysteresis 84 would no longer be required and may be eliminated. Circuit 97 indicates schematically the duplication for the Y axis of the measuring and control system employed shown for the Z axis. Circuit 97 provides two outputs corresponding to those from hysteresis circuits 63 and 66; and these two outputs are coupled to OR circuit 81, which now has five inputs. Where only $d\theta_n$ corrections are to be made to computer 60, converters 78 and 80, circuit 97, switch 98, and inverters 80a and 78a are no longer required components and may be eliminated. Furthermore no external use need by made of the cos (XN) and cos (YN) outputs of computer 60 since they are zero. Furthermore no $d\theta_x$ or $d\theta_y$ inputs will be coupled to computer 60. FIGURE 3 is a composite circuit which indicates specifically the production of $d\theta_n$ inputs to computer 60 where no corrections are made in latitude and North and also indicates generally the system connections where latitude and North are to be corrected by $d\theta_e$ and $d\theta_u$ inputs to computer 60.

When platform 15 is rotated about the Y axis relative to the reference frame in order to provide the fractional degree of declination from a calibrated null of a multiple-pole-pair Y axis gimbal angle transducer, then rotation about the Z axis causes the Y axis to move out of the equatorial plane Q. The coupling of the cos (YN) signal to the $d\theta_x$ input of computer 60 and to gyro 11 ensures that the Y axis will be restored to the equatorial plane, despite the cross-coupling which occurs upon rotation about the Z axis when the X axis is not in the equatorial plane. This enables the cos (YU) output to be measured in the equatorial plane and thus represent sidereal hour angle.

It is desired to determine from Equations 1 through 9 what terms are necessary for approximating the direction cosines for limited angular rotation. We will assume that in all cases an accuracy of 1" is required which corresponds to $4.86 \times 10^{-6}$ radians. If the angular rotations about the axes X, Y, and Z are limited to 2.7° corresponding to .047 radian, then the fourth order error is $(.047)^4 = 4.86 \times 10^{-6}$; and the inclusion of all third order terms will be necessary for an angular range of 2.7° of platform motion from the reference frame. If the angular motion of the platform from the reference frame is restricted to 0.97° which corresponds to .017 radian, then the third order error is $(.017)^3 = 4.86 \times 10^{-6}$; and all second order terms must be included in order that the error not exceed 1". If further simplification is desired so that only first order terms be included then motion of the platform relative to the reference frame must be restricted to .126° which corresponds to .00221 radian, since $(.00221)^2 = 4.86 \times 10^{-6}$.

In Equation 4, cos (YN) is equal to zero and hence of infinite order; cos (ZN) and cos (YE) are substantially equal to unity and therefore of zero order; and $d\theta_z$ and cos (XN) and cos (YU) are of first order. If the N axis is aligned with the earth's polar axis within 21", then $d\theta_u$ and $d\theta_e$ are of third order for platform movements of 2.7°, since 2.7° = .047 radian; and $(.047)^3 = 104 \times 10^{-6}$ radian which corresponds to 21.4". Thus on the right-hand side of Equation 4, the second term is of second order, being the product of two first order quantities; the third term is of fourth order, being the product of a third order quantity and a first order quantity; and the third term is of third order, being the product of a third order quantity and a zero order quantity. Hence in Equation 4, $d\theta_x \cos (ZN)$ must be of second order; and since $\cos (ZN)$ is of zero order, $d\theta_x$ must be of a second order. In Equation 2, $d\theta_y$ and $\cos (XE)$ and $\cos (ZU)$ are of first order. In Equation 2, $\theta_n$ may approach 30'. For platform rotations of 2.7°, a second order quantity must be less than $(.047)^2 = 1760 \times 10^{-6}$ radian which corresponds to 6.3'. Thus $\theta_n$ is of first order since it may exceed the 6' limit for a second order quantity even though less than the 2.7° limit for a first order quantity. Thus on the right-hand side of Equation 2, the first and second and fourth terms are of second order; and the third term is of third order. Hence $d \cos (ZE)$ and $\cos (ZE)$ must also be of second order.

From Equations 7 through 9 it will be noted that $\cos (XU)$ and $\cos (YE)$ and $\cos (ZN)$, while substantially equal to unity and thus of zero order, also contain second order terms. Retaining from Equations 1 through 9 all third order terms we obtain

(10) $d \cos (XE) = d\theta_z \cos (YE) - d\theta_y \cos (ZE) - d\theta_n \cos (XU)$

(11) $d \cos (ZE) = d\theta_y \cos (XE) - d\theta_x + d\theta_u - d\theta_n \cos (ZU)$

(12) $d \cos (XN) = -d\theta_y \cos (ZN) + d\theta_e$

(13) $d \cos (YN) = d\theta_x - d\theta_z \cos (XN) - d\theta_u = 0$

(14) $d \cos (YU) = d\theta_x \cos (ZU) - d\theta_z \cos (XU) + d\theta_n \cos (YE)$

(15) $d \cos (ZU) = d\theta_y \cos (XU) - d\theta_x \cos (YU) + d\theta_n \cos (ZE) - d\theta_e$

(16) $\cos (XU) = 1 - \frac{(\cos \overline{XE})^2}{2} - \frac{(\cos \overline{XN})^2}{2}$ (16a) $\cos (XU) = 1 - \frac{(\cos \overline{YU})^2}{2} - \frac{(\cos \overline{XN})^2}{2}$ (16b) $\cos (XU) = 1 - \frac{(\cos \overline{XE})^2}{2} - \frac{(\cos \overline{ZU})^2}{2}$ (16c) $\cos (XU) = 1 - \frac{(\cos \overline{YU})^2}{2} - \frac{(\cos \overline{ZU})^2}{2}$

(17) $\cos (YE) = 1 - \frac{(\cos \overline{XE})^2}{2}$ (17a) $\cos (YE) = 1 - \frac{(\cos \overline{YU})^2}{2}$

(18) $\cos (ZN) = 1 - \frac{(\cos \overline{XN})^2}{2}$ (18a) $\cos (ZN) = 1 - \frac{(\cos \overline{ZU})^2}{2}$ Comparing Equations 1 and 10, we see that the fourth order term $d\theta_u \cos (XN)$ has been eliminated. Comparing Equations 2 and 11, it will be noted that $d\theta_x \cos (YE)$ may be approximated by merely $d\theta_x$ and $d\theta_u \cos (ZN)$ may be approximated by $d\theta_u$. Comparing Equations 3 and 12, the term $d\theta_z \cos (YN)$ may be eliminated since $\cos (YN)$ is zero; the fourth order term $d\theta_u \cos (XE)$ may be eliminated; and $d\theta_e \cos (XU)$ may be replaced merely by $d\theta_e$. Comparing Equations 4 and 13, $$\theta_x \cos (ZN)$$

may be replaced merely by $d\theta_x$; the fourth order term $d\theta_e \cos (YU)$ may be eliminated; and $d\theta_u \cos (YE)$ may be replaced merely by $d\theta_u$. Comparing Equations 5 and 14, the infinite order term $d\theta_e \cos (YN)$, which is equal to zero, may be eliminated. Comparing Equations 6 and 15, the term $d\theta_e \cos (ZN)$ may be replaced merely by $d\theta_e$. It will be noted that Equations 16 through 18, corresponding to Equations 7 through 9, are not of the incremental or integral form as have been all previous equations. Rather, the three direction cosines approximating unity may be directly computed. In Equations 1 through 6 and 10 through 15, the terms involve products of quantities measured about substantial orthogonal axes. However, in Equations 7 through 9, the terms involve products of quantities measured about substantially co-linear axes. These terms are therefore the products of substantially dependent quantities; and the indicated integration of a single variable may thus be performed. The following series expansion is well known:

$$\cos A = 1 - \frac{A^2}{2!} + \frac{A^4}{4!} \cdots$$

If we eliminate all terms of the fourth order and higher, then $$\cos A = 1 - \frac{A^2}{2}$$

If a vector is rotated through a small angle A in one direction and through a small angle B in an orthogonal direction, then the total angular rotation of the vector is substantially equal to $\sqrt{A^2 + B^2}$. The cosine of this resultant angle, which is small, will then be $$1 - \frac{\sqrt{A^2 + B^2}^2}{2} = 1 - \frac{A^2}{2} - \frac{B^2}{2}$$

In Equation 7, $\theta_z$ and $\theta_n$ are measured about substantially co-linear axes; and both $\cos (YU)$ and $\cos (XE)$ measure essentially the algebraic summation of $\theta_x$ and $\theta_n$. Accordingly, in Equation 16, $\cos (XE)$ may be subsituted for $\cos (YU)$ without sensible effect. Also in Equation 7, $\theta_y$ and $\theta_e$ are measured about substantially co-linear axes; and both $\cos (ZU)$ and $\cos (XN)$ measure essentially the algebraic summation of $\theta_y$ and $\theta_e$. Thus in Equation 16, $\cos (XN)$ may be substituted for $\cos (ZU)$ without sensible effect. Comparing Equations 8 and 17, the fourth order term $d\theta_x \cos (ZE)$ and the infinite order term $d\theta_u \cos (YN)$ may be eliminated. We are left therefore with the term $d\theta_z \cos (XE)$ and $d\theta_n \cos (YU)$. In Equation 17, $\cos (YU)$ may again be substituted for $\cos (XE)$ with equal effect. Comparing Equations 9 and 18, the infinite order term $d\theta_x \cos (YN)$ and the fifth order term $d\theta_u \cos (ZE)$ may be eliminated. In Equation 18, $\cos (XN)$ may again be substituted with equivalent effect for $\cos (ZU)$. However, in retaining third order terms it will be noted that the well known series expansion $$\sin A = A - \frac{A^3}{3!} + \frac{A^5}{5!} \cdots$$

requires that the fractional degree outputs of the calibrated sidereal hour and calibrated declination be expressed not simply in radians but instead as the sine of the fractional degree angle in order to include the effect of the third order term $A^3/3!$ If platform rotations relative to the reference frame are limited to 0.97° then we need only consider second order terms. Since 0.97° corresponds to .017 radian, and since $.017^2 = 289 \times 10^{-6}$ corresponds to 59.6" or substantially 1', then $d\theta_e$ and $d\theta_u$ are of second order, provided the N axis is aligned with the earth's polar axis within 59". Retaining in either Equations 1 through 9 or in Equations 10 through 18 only the second order terms we obtain

(19) $d \cos (XE) = d\theta_z - d\theta_n$

(20) $d \cos (ZE) = d\theta_y \cos (XE) - d\theta_x + d\theta_u - d\theta_n \cos (ZU)$

(21) $d \cos (XN) = -d\theta_y + d\theta_e$

(22) $d \cos (YN) = d\theta_x - d\theta_z \cos (XN) - d\theta_u = 0$

(23) $d \cos (YU) = -d\theta_z + d\theta_n$

(24) $d \cos (ZU) = d\theta_y - d\theta_e$

(25) $\cos (XU) = 1 - \frac{(\cos \overline{XE})^2}{2} - \frac{(\cos \overline{XN})^2}{2}$ (25a) $\cos (XU) = 1 - \frac{(\cos \overline{YU})^2}{2} - \frac{(\cos \overline{XN})^2}{2}$ (25b) $\cos (XU) = 1 - \frac{(\cos \overline{XE})^2}{2} - \frac{(\cos \overline{XU})^2}{2}$ (25c) $$\cos(XU) = 1 - \frac{(\cos \overline{YU})^2}{2} \frac{(\cos \overline{ZU})^2}{2}$$

(26) $$\cos(YE) = 1 - \frac{(\cos \overline{XE})^2}{2}$$

(26a) $$\cos(YE) = 1 - \frac{(\cos \overline{YU})^2}{2}$$

(27) $$\cos(ZN) = 1 - \frac{(\cos \overline{XN})^2}{2}$$

(27a) $$\cos(ZN) = 1 - \frac{(\cos \overline{ZU})^2}{2}$$

Comparing Equations 10 and 19 it will be seen that $d\theta_z \cos(YE)$ may be replaced merely by $d\theta_z$; $d\theta_n \cos(XU)$ may be replaced merely by $d\theta_n$; and the third order term $d\theta_y \cos(ZE)$ may be eliminated. Comparing Equations 11 and 20 it will be seen that no simplification results. Comparing Equations 12 and 21 it will be seen that $d\theta_y \cos(ZN)$ may be replaced by $d\theta_y$. Comparing Equations 13 and 22 it will be noted that no simplification results. Comparing Equations 14 and 23, the third order term $d\theta_x \cos(ZU)$ may be eliminated; $d\theta_z \cos(XU)$ may be replaced merely by $d\theta_z$; and $d\theta_n \cos(YE)$ may be replaced merely by $d\theta_n$. Comparing Equations 15 and 24, the third order terms $d\theta_x \cos(YU)$ and $d\theta_n \cos(ZE)$ may be eliminated; and $d\theta_y \cos(XU)$ may be replaced merely by $d\theta_y$. Comparing Equations 16 through 18 and 25 through 27, it will be seen that no simplification results. For the second order equations $\sin A = A$; and the fractional degree portion of calibrated SHA and calibrated DEC may be expressed in radians. Performing the indicated integrations in Equations 19 and 23 we find:

$$\cos(XE) = \theta_z - \theta_n = -\cos(YU)$$

Performing the indicated integrations in Equations 21 and 24 we find:

$$\cos(ZU) = \theta_y - \theta_e = -\cos(XN)$$

Thus the basis for obtaining Equations 16 through 18 from Equations 7 through 9 will now be clear.

If the angular rotation of the platform relative to the reference frame is restricted to .126° then only the first order terms need be retained. Equation 20 reduces to

(28) $$d\cos(ZE) = -d\theta_x + d\theta_u$$

Equation 22 reduces to

(29) $$d\cos(YN) = d\theta_x - d\theta_u = 0$$

while Equations 25 through 27 reduce to

(30) $\cos(XU) = 1$
(31) $\cos(YE) = 1$
(32) $\cos(ZN) = 1$

Performing the indicated integrations in Equations 28 and 29, we find:

$$\cos(YN) = \theta_x - \theta_u = -\cos(ZE) = 0$$

In the embodiment shown, computer 60 need not perform computations exceeding a range of ±59′30″ which is .992°. This does not appreciably exceed the limit of .97° for the second order equations. In each of the foregoing third and second order equations the maximum cross-products have been assumed; that is, the motion of a platform axis in returning to a given point is assumed to describe the largest possible hysteresis loop. It will be appreciated that such hysteresis loops may be completely eliminated by sequential torquing of the platform so that no area is included in the closed curve describing the motion of an axis in deviating from and returning to a given point. Furthermore, even if no provision is made for eliminating such hysteresis loops, the probabilities are that for changes in one coordinate, the average value of an orthogonal coordinate would not exceed half its maximum value. Accordingly in the second order equations the probable error will not exceed 0.5″; and in the third order equations the probable error will not exceed 0.25″.

The second order of equations then offer the best compromise between simplifying the computation of the direction cosines at the expense of employing multiple pole pair resolvers having an extremely large number of poles and reducing the number of pole pairs of the gimbal angle resolver at the expense of increasing the complexity of the computation of direction cosines. In the specific embodiment shown, the ground alignment of the Z axis with the earth's polar axis is assumed to be correct within a few seconds so that only one star sight need be made and angular rotations about only the Z axis are required. Accordingly $d\theta_x$, $d\theta_y$, $d\theta_e$, and $d\theta_u$ are zero. From Equations 21 and 24, $\cos(XN)$ and $\cos(ZU)$ are zero; and from Equations 20 and 22, $\cos(ZE)$ and $\cos(YN)$ are zero. Thus Equations 19 through 27 reduce to the following:

(35) $$\cos(ZN) = 1$$

(34) $$\cos(XU) = 1 - \frac{(\cos \overline{XE})^2}{2} = 1 - \frac{(\cos \overline{YU})^2}{2} = \cos(YE)$$

(35) $$\cos(ZN) = 1$$

Referring now to FIGURE 4 we have shown the entire direction cosine computer for the specific embodiment shown. The $d\theta_z$ input to computer 60 is coupled to an integrator 85; and the $d\theta_n$ input is coupled to an integrator 94. Integrator 94 of FIGURE 4 may be the same integrator shown in FIGURE 3; and thus this integrator need not be redundantly included within computer 60. The outputs of integrators 85 and 94 are coupled to a subtraction circuit 87 the output of which, as will be seen from Equation 33, is $\cos(XE)$. The output of circuit 87 is coupled to an inverter 88 which merely changes the polarity of the sign to provide an output $\cos(YU)$. The $\cos(YU)$ output of circuit 88 (or equally as well the $\cos \overline{XE}$ output of circuit 87) is coupled to a squaring circuit 89. The output of squaring circuit 89 is coupled to a halver 91 which divides the output of the squarer 89 by a factor of two as, for example, by merely shifting a binary coded output through one place of significance. A source 92 provides a digital indication of positive unity. The outputs of source 92 and of halver 91 are coupled to a subtraction circuit 93 which provides the output $\cos(XU) = \cos(YE)$, as will be appreciated from Equation 34. The output of circuit 92 is also coupled directly to the $\cos(ZN)$ output of computer 60, since from Equation 35 $\cos(ZN) = 1$.

The signals coupled to windings 42a and 42b of resolver 42 define a magnetic vector which indicates, in reference frame coordinates comprising sidereal hour angle and declination, the error of the line of sight 17 from the assumed position of a selected star such as Vega. It is, however, necessary to transform this magnetic vector in reference frame coordinates into a resulting magnetic vector in missile coordinates appropriate for actuating the roll and pitch controllers. This is the purpose of resolver 42. Assume that the missile is yawed through 90° about the axis W. The orientation of the line of sight 17 relative to inertial space is, of course, not changed. With such new orientation of the missile the pitch axis now controls orientation of the line of sight 17 in declination; and the roll axis controls orientation of the line of sight in sidereal hour angle. The rotation of the missile in yaw through 90° about the axis W shifts the relative positions of the rotor and stator of resolver 42 by 90°. Thus a sidereal hour angle error signal applied to winding 42a is coupled to winding 42d to actuate the roll controller 51; and a declination error signal applied to winding 42b is coupled to winding 42c to actuate the pitch controller 52.

Signals coupled to windings 44a and 44b of the resolver 44 define a magnetic vector which indicates, in roll and pitch missile coordinates, the error between the assumed position of the star and its actual position. It is necessary to transform this magnetic vector in missile coordinates into a resulting magnetic vector in reference frame coordinates appropriate for applying $d\theta_e$, $d\theta_u$, and $d\theta_n$ corrections to computer 60. This is the purpose of resolver 44. Assume the missile is yawed through 90° about the axis W from the position shown in FIGURE 2. With such new orientation of the missile, a $\theta_r$ output from star sensor 16 indicates an error in the assumed initial longitude. Such signal applied to winding 44b is now coupled to winding 44c which, through converter 36, provides the $\theta_n'$ output. It will be appreciated that where $\theta_e$ and $\theta_u$ corrections are to be made, then the stator of resolver 44 may be provided with a further winding displaced by 90 electrical degrees from winding 44c as are the two windings of the stator of resolver 42. The $\theta_e$ and $\theta_u$ stellar corrections are obtained from such winding.

It is the purpose of dividing circuits 74 and 79 to control respectively the maximum angular torquing rate of gyro 13 and the maximum rate with which $d\theta_n$ corrections are made to computer 60. These angular rates are the same and depend on the clock frequency of the digital-to-analog converter 82 and computer 60 as shown in the aforementioned copending application for Random Orientation Inertial System. Since computer 60 solves integral equations, it is desired that the computational increment be fairly small. It will be noted that even if dividing circuits 74 and 79 are eliminated, the angular increments cannot exceed the 30" output of limiters 71 and 77. There is the further consideration that the torquing rate of a gyroscope is limited since power dissipation and magnetic saturation introduce nonlinearities which impair accurcy. If rotation of the vehicle exceeds the maximum torquing rate of gyro 13, as determined by the clock frequency and limiter 71 and dividing circuit 74, then the output of inverter 61a will exceed 30", causing hysteresis circuit 66 to provide an output which through OR circuit 81 disables gate 90. Thus no stellar corrections can be made where the sine output of multiple pole pair resolver 24 deviates by more than 3 electrical degrees from a null. It will be appreciated that a maneuvering transient occasioned as, for example, by a momentary runaway of one of the yaw, roll, and pitch controllers 50 through 52, cannot disturb the platform since it is isolated from missile rotation by the gimbal servomotors. The platform is subjected to rotation only by virtue of the limited torquing signal coupled to converters 78, 80, and 82.

From the foregoing it will be appreciated that we may employ the following alternative connections. The output of circuit 73, rather than being coupled to converter 82 and the $d\theta_z$ input of computer 60, may instead be applied through amplifier 40 to servomotor 23. The $\theta_z$ output of gyro 13, rather than being coupled through amplifier 40 to servomotor 23, may instead be applied simultaneously to converter 82 and the $d\theta_z$ input of computer 60. With such alternative connections, the output of circuit 73 directly drives the servomotor to maintain the sine output of resolver 24 at one of its nulls. This causes synchronous rotation of the platform and the missile. The resulting output $\theta_z$ of gyro 13 occasioned by the strapping of the platform to the missile applies a torquing signal through converter 82 to maintain the gyro output nulled and couples corresponding angular indications $d\theta_z$ to computer 60. The alternative connections thus lead to a conventional strapdown system, since the platform is forced to follow rotation of the vehicle irrespective of the velocity. This alternative connection might cause the torquing limits of the gyroscopes to be exceeded. As shown in the copending application for Inertial Platform Operative in Either the Strapped-Down or Gimbal Mode as Selected, Ser. No. 148,761, filed Oct. 30, 1961, now Patent No. 3,310,876, the gyroscopes may be prevented from exceeding their torquing limits by applying the $\theta_z$ output of gyro 13 to a dead-band or hysteresis circuit which provides no output so long as the $\theta_z$ signal is less than a value corresponding to the torquing limit of gyro 13. The output of the dead-band hysteresis circuit is applied to servomotor 23 with such polarity to oppose rotation of the gyroscope. Thus when the $\theta_z$ output reaches a magnitude corresponding to the torquing limit, the strapdown slaving signal from circuit 73 to servomotor 23 is opposed by the output of the dead-band hysteresis circuit; and the system no longer operates in a strapdown mode, since the servomotor is prevented from causing the platform to follow movements of the missile. Both the system connection we have shown and the alternative system connection shown in the copending application for Stellar-Azimuth Inertial Guidance System achieve the same result; that is, the synchronous rotation of the platform and vehicle for moderate rotation rates and the isolation of the vehicle and platform for high vehicle rotation rates exceeding the torquing limits of the platform gyros.

In the taking of a plurality of star sights, as is necessary where $d\theta_e$ and $d\theta_u$ corrections are to be made to computer 60, the initial rotation of the missile in shifting the line of sight from a first star (such as Vega) to a second star produces a platform rotation which corresponds to that of the vehicle. However, after a platform rotation of between 29'30" and 59'30" from alignment with the reference frame axis, our system reverts to a pure platform mode; and the platform remains fixed relative to inertial space as the missile rotates about it. When the line of sight is within 30' of the second star, then our system reverts to a strapdown mode in which the sine output of resolver 24 is maintained at a different one of its calibrated nulls.

It will be seen that we have accomplished the objects of our invention. Our phased guidance system operates selectively as a mechanically stabilized platform system and as a computationally stabilized strapdown system. In our multiple-mode phased guidance system, gimbal angles need be calibrated at but a few discrete positions corresponding to the angular coordinates of perhaps three stars. Since deviations of the platform from the reference frame are limited to small angles, the strapdown computations are simplified.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A guidance system for a vehicle including in combination a gyroscope, means mounting the gyroscope for rotation relative to the vehicle, angular transducing means responsive to rotation of the mounting means for providing a first signal, the angular transducing means being calibrated at a plurality of discrete angular positions, means for providing a second signal corresponding to one of said discrete positions, means for providing a third signal representing an angle less than the angular difference between said one discrete position and an adjacent discrete position, means responsive to the first and second signals for torquing the gyroscope through a limited angle and for providing an angular indication in accordance with such torquing, and means responsive to the first and second and third signals and to the angular indication for controlling rotation of the vehicle.

2. A guidance system for a vehicle including in combination a gyroscope, means mounting the gyroscope for rotation relative to the vehicle, angular transducing means responsive to rotation of the mounting means for providing a first signal, the angular transducing means being calibrated at a plurality of discrete angular positions, means for providing a second signal corresponding to one of said discrete positions, means for providing a third signal representing an angle less than the angular difference between said one discrete position and an adjacent discrete position, means responsive to the first and second signals for torquing the gyroscope and for providing an angular indication in accordance with such torquing, and means responsive to the angular indication and the third signal for controlling rotation of the vehicle.

3. A guidance system for a vehicle including in combination a platform, means mounting the platform for rotation relative to the vehicle, an angular transducer responsive to rotation of the mounting means, the transducer being calibrated at a plurality of discrete angular positions, means for rotating the vehicle relative to the platform until the transducer is near one of its calibrated angular positions, means for causing the platform to rotate with further rotation of the vehicle within predetermined limits so that within such limits of further vehicle rotation the transducer remains adjacent said calibrated position, and means responsive to rotation of the platform for providing an angular indication in accordance therewithin.

4. A guidance system for a vehicle including in combination a platform, means mounting the platform for rotation relative to the vehicle, an angular transducer responsive to rotation of the mounting means, the transducer being calibrated at a plurality of discrete angular positions, means for rotating the vehicle relative to the platform until the transducer is near one of its calibrated angular positions, means for causing the platform to rotate with further rotation of the vehicle so that the transducer remains adjacent said calibrated position, and means responsive to rotation of the platform for providing an angular indication in accordance therewith.

5. A guidance system for a vehicle including in combination a platform mounted for rotation relative to the vehicle, means for gyroscopically stabilizing the platform relative to an inertial reference frame, means for producing limited angular rotation of the platform relative to the reference frame, and means responsive to such platform rotation for providing a corresponding angular indication.

6. A guidance system for a vehicle including in combination a platform mounted for rotation relative to the vehicle, means for gyroscopically stabilizing the platform in a reference frame, means for producing limited angular rotation of the platform from the reference frame, and means responsive to such platform rotation for providing a corresponding angular indication.

7. A guidance system for a vehicle including in combination a stable platform, first means for determining the attitude of the vehicle relative to the platform, second means for determining the attitude of the platform relative to an inertial reference frame, means responsive to the first means for controlling the second means, the controlling means including means for limiting angular rotation of the platform relative to the reference frame, and means responsive to the first and second means for determining the attitude of the vehicle relative to inertial space.

8. A guidance system for a vehicle including in combination a stable platform, first means for determining the attitude of the vehicle relative to the platform, second means for determining the attitude of the platform relattive to a reference frame, means responsive to the first means for controlling the second means, the controlling means including means for limiting angular deviation of the platform from the reference frame, and means responsive to the first and second means for determining the attitude of the vehicle relative to the reference frame.

9. A guidance system for a vehicle including in combination a stable platform, first means for determining the attitude of the vehicle relative to the platform, second means for determining the attitude of the platform relative to an inertial reference frame, means responsive to the first means for controlling the second means, and means responsive to the first and second means for determining the attitude of the vehicle relative to the reference frame.

10. A guidance system for a vehicle including in combination a stable platform, first means for determining the attitude of the vehicle relative to the platform, second means for determining the attitude of the platform relative to a reference frame, means responsive to the first means for controlling the second means, and means responsive to the first and second means for determining the attitude of the vehicle relative to the reference frame.

11. A guidance system including in combination a stable platform having orthogonally disposed axes X and Y and Z, computing means establishing a reference frame nominally fixed relative to inertial space and having orthogonally disposed axes E and N and U, the U and X axes being nominally parallel, the E and Y axes being nominally parallel, the N and Z axes being nominally parallel, the Y axis being substantially co-planar with the E and U axes, means for producing limited angular rotation of the platform, and means for providing signals in accordance with small angular rotations of the reference frame, said computing means mechanizing at least one of the equations $$d \cos (ZE) = d\theta_y \cos (XE) - d\theta_x + d\theta_u - d\theta_n \cos (ZU)$$
$$d \cos (XN) = -d\theta_y \cos (ZN) + d\theta_e$$
$$d \cos (YN) = d\theta_x - d\theta_z \cos (XN) - d\theta_u = 0$$
$$d \cos (ZU) = d\theta_y \cos (XU) - d\theta_x \cos (YU) + d\theta_n \cos (ZE) - d\theta_e$$

$$\cos (XU) = 1 - \frac{(\cos \overline{XE})^2}{2} - \frac{(\cos \overline{XN})^2}{2}$$
$$= 1 - \frac{(\cos \overline{YU})^2}{2} - \frac{(\cos \overline{XN})^2}{2}$$
$$= 1 - \frac{(\cos \overline{XE})^2}{2} - \frac{(\cos \overline{ZU})^2}{2}$$
$$= 1 - \frac{(\cos \overline{YU})^2}{2} - \frac{(\cos \overline{ZU})^2}{2}$$
$$\cos (YE) = 1 - \frac{(\cos \overline{XE})^2}{2}$$
$$= 1 - \frac{(\cos \overline{YU})^2}{2}$$
$$\cos (ZN) = 1 - \frac{(\cos \overline{XN})^2}{2}$$
$$= 1 - \frac{(\cos \overline{ZU})^2}{2}$$

where $d\theta_x$ and $d\theta_y$ and $d\theta_z$ represent incremental rotations about the respective platform axes X and Y and Z, and where $d\theta_e$ and $d\theta_n$ and $d\theta_u$ are signals representing rotational increments about the respective reference frame axes E and N and U.

12. A guidance system including in combination a stable platform having orthogonally disposed axes X and Y and Z, computing means establishing a reference frame nominally fixed relative to inertial space and having orthogonally disposed axes E and N and U, the U and X axes being nominally parallel, the E and Y axes being nominally parallel, the N and Z axes being nominally parallel, means for producing limited angular rotation of the platform, and means for providing signals in accordance with small angular rotations of the reference frame, said computing means mechanizing at least one of the equations $$\cos (XE) = \theta_z - \theta_n = -\cos (YU)$$
$$\cos (ZU) = \theta_y - \theta_e = -\cos (XN)$$

where $\theta_y$ and $\theta_z$ represent rotations about the respective platform axes Y and Z, and where $\theta_e$ and $\theta_n$ are signals representing rotation about the respective reference frame axes E and N.

13. A guidance system including in combination a stable platform having orthogonally disposed axes X and Y and Z, computing means establishing a reference frame nominally fixed relative to inertial space and having orthogonally disposed axes E and N and U, the U and X axes being nominally parallel, the E and Y axes being nominally parallel, the N and Z axes being nominally parallel, the Y axis being substantially co-planar with the E and U axes, means for producing limited angular rotation of the platform, and means providing a signal in accordance with small angular rotations of the reference frame, said computing means mechanizing at least one of the equations $$\cos(YN) = \theta_x - \theta_u = -\cos(ZE) = 0$$
$$\cos(XU) = 1$$
$$\cos(YE) = 1$$
$$\cos(ZN) = 1$$

where $\theta_x$ represents rotation about the X platform axis, and where $\theta_u$ is a signal representing rotation about the U reference frame axis.

14. A guidance system including in combination a stable platform having orthogonally disposed axes X and Y and Z, computing means for establishing a reference frame nominally fixed relative to inertial space and having orthogonally disposed axes E and N and U, the U and X axes being nominally parallel, the E and Y axes being nominally parallel, the N and Z axes being substantially parallel, means for producing limited angular rotation of the platform about the Z axis, and means providing a signal in accordance with small angular rotations of the reference frame, said computing means mechanizing each of the equations $$\cos(XE) = \theta_z - \theta_n = -\cos(YU)$$
$$\cos(XU) = 1 - \frac{(\cos \overline{XE})^2}{2} = 1 - \frac{(\cos \overline{YU})^2}{2} = \cos(YE)$$
$$\cos(ZN) = 1$$

where $\theta_z$ represents rotation about the Z platform axis, and where $\theta_n$ is a signal representing rotation about the N reference frame axis.

15. A guidance system including in combustion a stable platform having orthogonally disposed axes X and Y and Z, computing means establishing a reference frame having orthogonally disposed axes E and N and U, the U and X axes being nominally parallel, the E and Y axes being nominally parallel, the N and Z axes being nominally parallel, the Y axis being substantially co-planar with the E and U axes, and means for producing limited angular rotation of the platform, said computing means mechanizing at least one of the equations $$\cos(XE) = \theta_z = -\cos(YU)$$
$$d\cos(ZE) = d\theta_y \cos(XE) - d\theta_x$$
$$d\cos(YN) = d\theta_x - d\theta_z \cos(XN) = 0$$
$$\cos(ZU) = \theta_y = -\cos(XN)$$

where $d\theta_x$ and $d\theta_y$ and $d\theta_z$ represent incremental rotations about the respective platform axes X and Y and Z.

16. A guidance system including in combination a stable platform having orthogonally disposed axes X and Y and Z, computing means for establishing a reference frame having orthogonally disposed axes E and N and U, the U and X axes being nominally parallel, the E and Y axes being nominally parallel, the N and Z axes being substantially parallel, and means for producing limited angular rotation of the platform about the Z axis, said computing means mechanizing each of the equations $$\cos(XE) = \theta_z = -\cos(YU)$$
$$\cos(XU) = 1 - \frac{(\cos \overline{XE})^2}{2} = 1 - \frac{(\cos \overline{YU})^2}{2} = \cos(YE)$$
$$\cos(ZN) = 1$$

where $\theta_z$ represents rotation about the Z platform axis.

References Cited
UNITED STATES PATENTS

| | | | |
|---|---|---|---|
| 2,989,681 | 6/1961 | Bower | 318—20.530 |
| 3,039,032 | 6/1962 | Fowler | 318—20.530 |
| 3,149,482 | 9/1964 | Gitlin | 318—20.530 |
| 3,198,940 | 8/1965 | Loper | 244—3.2 X |
| 3,232,103 | 2/1966 | Schneider | 244—150.25 |
| 3,260,485 | 7/1966 | Lerman | 244—14 X |
| 3,263,944 | 8/1966 | Watson | 244—14 |

BENJAMIN A. BORCHELT, *Primary Examiner.*

CHESTER L. JUSTUS, *Examiner.*

G. M. FISHER, T. H. WEBB, *Assistant Examiners.*